J. M. BENNETT.
COMBINATION AUTO ABSTRACT AND DEPOSIT SYSTEM.
APPLICATION FILED JAN. 29, 1921.
1,402,339.
Patented Jan. 3, 1922.
3 SHEETS—SHEET 1.
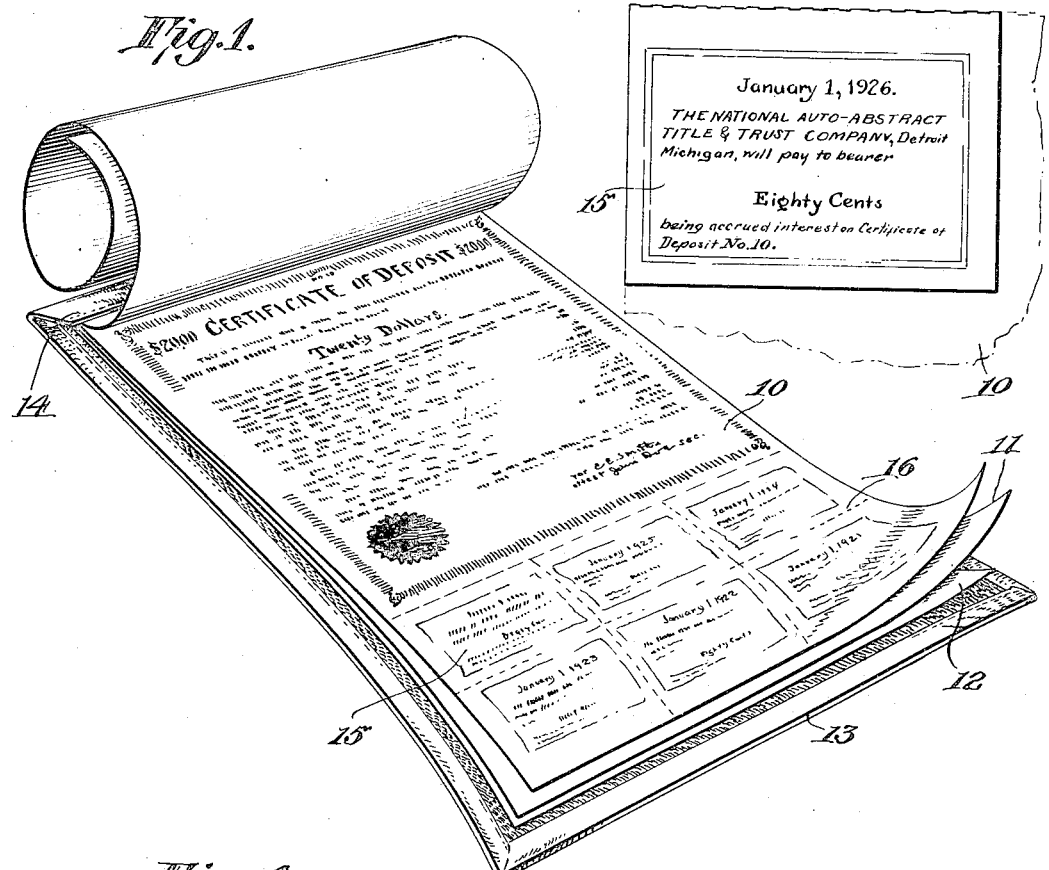
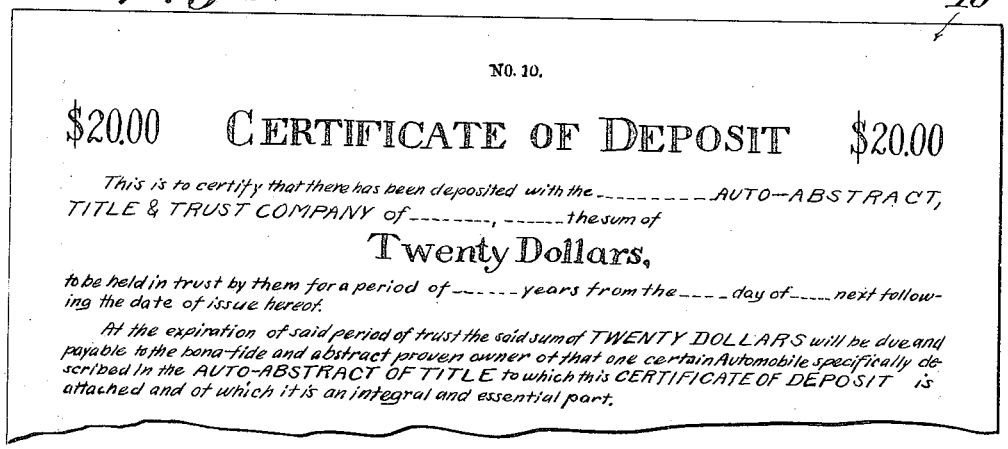

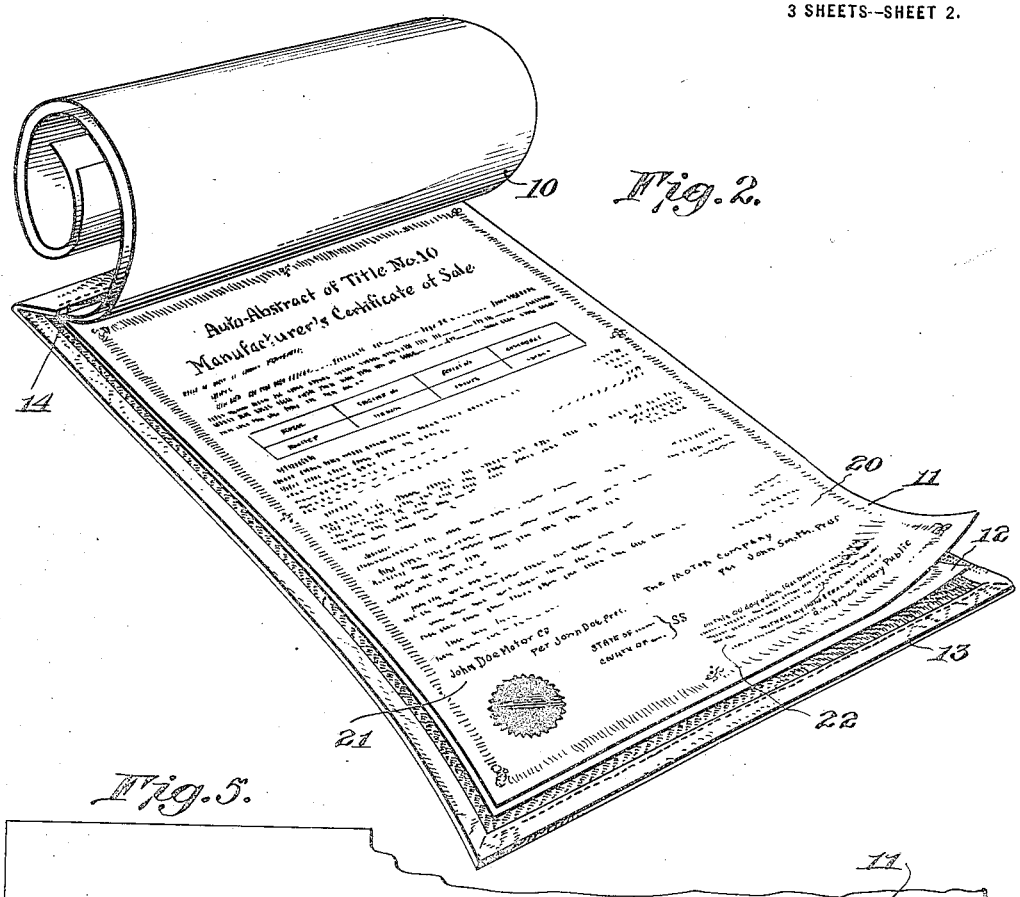

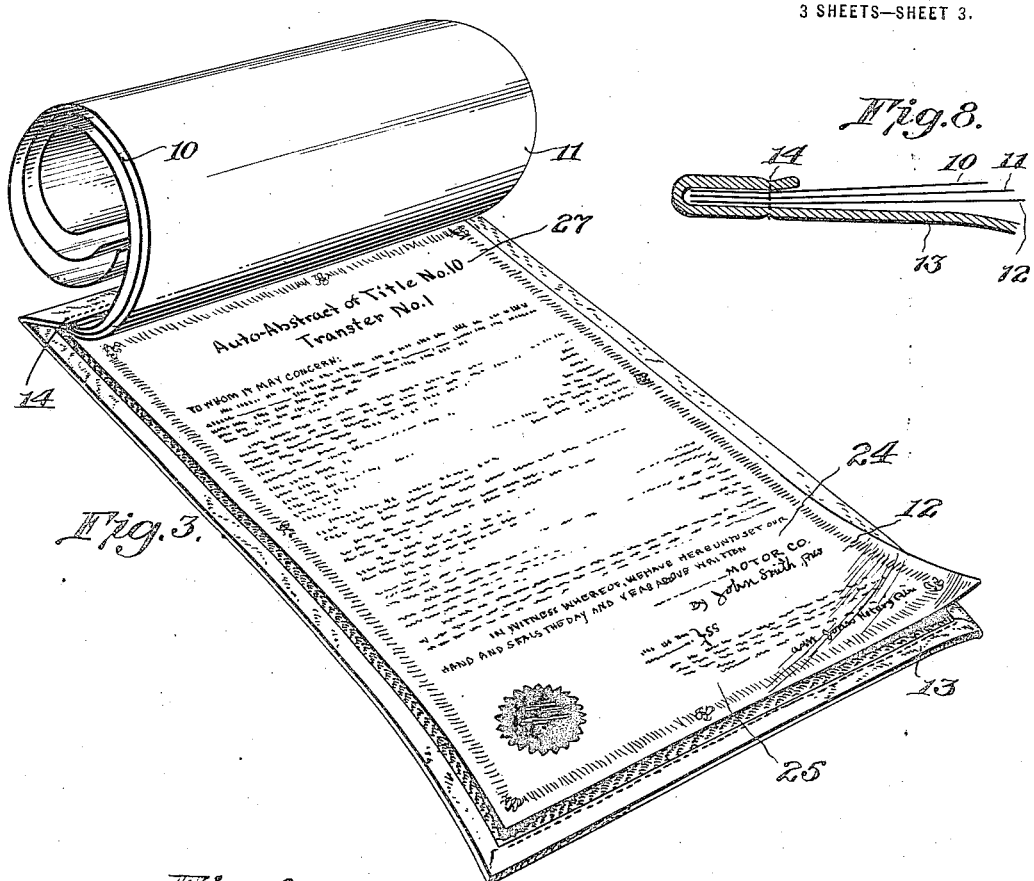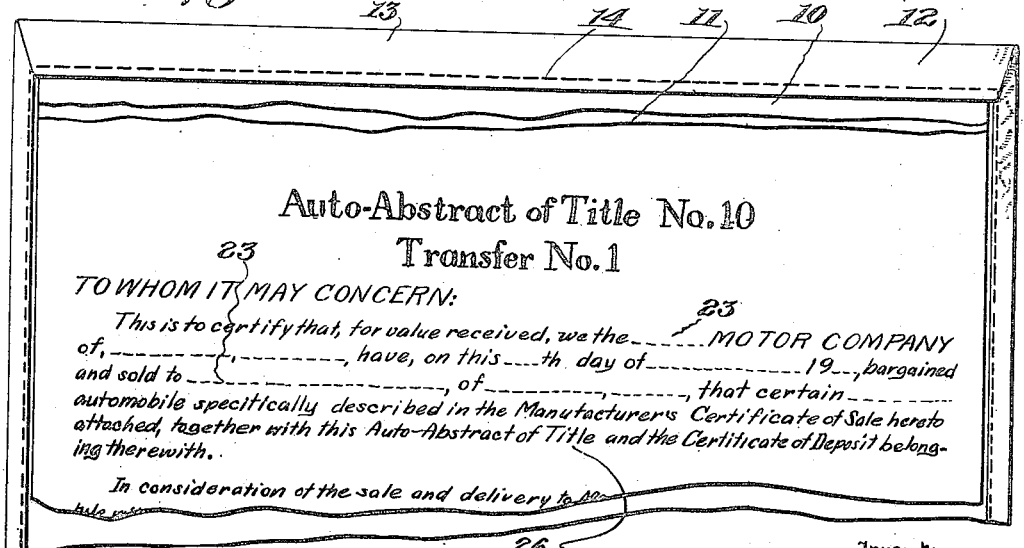

UNITED STATES PATENT OFFICE.

JOHN M. BENNETT, OF ATLANTIC, IOWA.

COMBINATION AUTO ABSTRACT AND DEPOSIT SYSTEM.

1,402,339.              Specification of Letters Patent.        Patented Jan. 3, 1922.

Application filed January 29, 1921. Serial No. 441,080.

*To all whom it may concern:*

Be it known that JOHN M. BENNETT, a citizen of the United States, residing at Atlantic, in the county of Cass and State of Iowa, has invented certain new and useful Improvements in Combination Auto Abstract and Deposit Systems, of which the following is a specification.

This invention relates to the sale and resale of automobiles and the like and has special reference to a title transfer record.

More particularly the invention relates to means of improved and novel character for carrying into effect a system whereby proof of ownership of an automobile offered for sale may always be available.

One important object of the invention is to provide means of novel character which will impel the owner of an automobile or other like property to retain documentary proof of his ownership.

A second important object of the invention is to provide means of novel character which will induce the owner of an automobile to transfer, with the automobile, documentary evidence of his title to the property.

A third important object of the invention is to provide means which will impel the purchaser of an automobile to demand from the seller clear documentary evidence of the transaction.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a perspective view of the inseparably united documents forming the invention open to show the first of said documents.

Figure 2 is a similar view of said documents showing the second thereof.

Figure 3 is a similar view showing the third document.

Figure 4 is a view showing an essential part of the first document.

Figure 5 is a similar view of the second document.

Figure 6 is a similar view of the third document.

Figure 7 is a view of a detachable coupon associated with the first document.

Figure 8 is a detail section showing the manner of binding the documents inseparably.

This invention is shown in its present embodiment as peculiarly applied to automobiles but it is not necessarily restricted to any particular species of property, being in its nature applicable to a wide variety. It is accordingly to be understood that wherever reference is made to an automobile in this specification or the drawings the invention is not to be considered as limited thereby.

In order to comprehend the invention it is to be understood that three or more documents are provided the first of which is a certificate of deposit 10. Bound to this certificate of deposit is a manufacturer's certificate of sale 11. Bound to these two are one or more transfers 12. These three documents are securely and inseparably bound in a cover 13 of leather or like wear resisting material, being stitched thereto as by the stitching 14.

The certificate of deposit 10 is a document setting forth that there has been deposited in the hands of a suitable trustee a definite sum of money which will be paid to the owner of the said certificate and the remainder of the documents at the end of a certain period of time. The proof of ownership of the certificate is contingent, as shown in the portion of the certificate illustrated in Figure 4, on the holder being the "abstract proven owner" of a certain automobile. The ownership of the certificate and of a certain automobile are therefore dependent for proof upon each other. This certificate of deposit also carries interest coupons 15 separated from each other and from the body of the certificate by weakened lines 16.

The manufacturer's certificate of sale is a document bearing blank spaces, as at 17, for the insertion of the manufacturer's name, business location, date of sale and purchaser's name. Spaces 18 are also provided for the identification of the machine sold. Also this document contains, as at 19, a transfer of the ownership of the automobile and of the attached certificate of deposit together with a space 20 for the seller's signature, a space 21 for the purchaser's signature and a notary's jurat 22.

Each transfer in like manner has spaces 23 for the identification of the seller and purchaser, a place 24 for the seller's signature and a notary's jurat 25. Also the transfer contains wording 26 transferring the automobile described in the manufacturer's certificate of sale 11 together with said certificate of sale and the certificate of deposit 10.

For the better security of the owner each sheet of the bound set of documents bears the same identification mark, as for instance a number such as is shown at 27.

To understand how these means are used to attain the desired end a concrete example may be taken. The John Doe Motor Co., being about to sell to the Roe Motor Co. (a sales agency) an automobile deposit with the Title Trust Co. twenty dollars. To get this twenty dollars back they charge the Roe Motor Co. twenty dollars more than the agent's price of the automobile. The Roe Motor Co., has to pay this in order to obtain the bill of sale which gives them the clear title to the property. The Roe Motor Co. naturally add this twenty dollars in the price at which they sell to the private purchaser and he in turn will demand the certificate of deposit and original bill of sale. Thus through all the transfers of the property each seller will include the twenty dollars deposited in his selling price and each purchaser will demand the full set of properly made out documents as only through them can he get back his twenty dollars and prove his ownership of the automobile and certificate of deposit. This will naturally impel each owner to care for and protect the documentary evidence of his purchase, will induce him to transfer such evidence with the property and will impel each purchaser to demand that the seller furnish the documents complete and in proper form.

There has thus been provided an efficient means of the kind described and for the purpose specified.

Having thus described the invention, what is claimed as new, is:—

1. In combination, a certificate of deposit having interest coupons detachably attached thereto, and a bill of sale having matter thereon transferring said certificate and permanently attached thereto, said bill of sale also having appropriately designated identification spaces for the insertion of descriptive data of an article sold in conjunction with said certificate.

2. In combination, a certificate of deposit having interest coupons detachably attached thereto, and a bill of sale having matter thereon transferring said certificate and permanently attached thereto, said bill of sale also having appropriately designated identification spaces for the insertion of descriptive data of an article sold in conjunction with said certificate, said bill of sale further having blanks for the insertion of data showing the vendor and vendee.

3. In combination, a certificate of deposit having interest coupons detachably attached thereto, a bill of sale having matter thereon transferring said certificate and permanently attached thereto, said bill of sale also having appropriately designated identification spaces for the insertion of descriptive data of an article sold in conjunction with said certificate, and a plurality of successively numbered transfer and abstract forms inseparably attached to the certificate and bill of sale.

4. In combination, a certificate of deposit having interest coupons detachably attached thereto, a bill of sale having matter thereon transferring said certificate and permanently attached thereto, said bill of sale also having identification spaces for the insertion of descriptive data of an article sold in conjunction with said certificate, said bill of sale further having appropriately designated blanks for the insertion of data showing the vendor and vendee, and a plurality of successively numbered transfer and abstract forms inseparably attached to the certificate and bill of sale.

5. In combination, a certificate of deposit having interest coupons detachably attached thereto, a bill of sale having matter thereon transferring said certificate and permanently attached thereto, said bill of sale also having appropriately designated identification spaces for the insertion of descriptive data of an article sold in conjunction with said certificate, and a plurality of successively numbered transfer and abstract forms inseparably attached to the certificate and bill of sale, said certificate, bill of sale and transfer forms all being provided with identical identification indicia.

In testimony whereof I affix my signature.

JOHN M. BENNETT.